Oct. 27, 1964  W. I. NEU  3,154,048

VEHICLE TIRE DEFLECTION WARNING DEVICE

Filed March 12, 1964

INVENTOR.
WALLACE I. NEU

ATTORNEYS

United States Patent Office 3,154,048
Patented Oct. 27, 1964

3,154,048
VEHICLE TIRE DEFLECTION WARNING DEVICE
Wallace I. Neu, 308 East Ave. E., Alpine, Tex.
Filed Mar. 12, 1964, Ser. No. 351,332
5 Claims. (Cl. 116—34)

This invention relates to an alarm device for inflatable tires and more particularly to an audible alarm for indicating tire deflection either resulting from a tire overload or tire deflation.

The major portion of vehicular highway traffic today comprises automobiles carrying passengers or light commercial loads supported by rubber inflatable tires. With the automobiles moving at high speed along today's highways, it is virtually impossible for the operator of the vehicle to know the conditon of the tire without stopping the vehicle and personally inspecting each of the tires to determine its condition as to both overload and inflation.

In order to allow the operator of the vehicle to know at all times the condition of the tires on the vehicle, especially during movement at high speed, a number of systems have been employed involving electrical or electronic communication means for transmitting signals indicative of tire inflation condition from the tires to the cab which is somewhat remote from the various wheels. Of necessity, the electrical and electronic communications systems are both complex, expensive and are not entirely dependable.

It is therefore a primary object of this invention to provide an audible alarm device for indicating the deflection condition of an inflatable tire which may be easily heard by the operator during normal operational movement of the vehicle regardless of how remote the specific wheel is from the vehicle operator.

It is a further object of this invention to provide an improved audible alarm device for indicating the deflection condition of a tire and therefore not only measure tire inflation, but is also indicative of vehicle overload.

It is a further object of this invention to provide an improved audible alarm device for indicating the deflection condition of an inflatable tire which is extremely simple in operation, consists of a minimum number of parts and which gives maximum dependability.

It is a further object of this invention to provide an improved audible alarm device for indicating the condition of an inflatable tire which is readily positioned within the interior of the inflated tire and which is adaptable for all conventional wheel sizes.

Further objects of this invention will be pointed out in the following detailed description and claims and illustrated in the accompanying drawing which discloses by way of example the principle of this invention and the best mode which has been contemplated of applying that principle.

In general, the apparatus of the present invention comprises a flexible, endless belt having an internal diameter somewhat in excess of the external diameter of the rim supporting a vehicle tire and positioned centrally of the rim and concentric therewith. Biasing means in the form of a U-shaped spring is positioned between the belt and the surface of the rim and therefore tending to create a bulge on a portion of the belt and spaced away radially from the rim. The flexible belt further includes a metal knocker fixed to the inner surface of the belt at the side opposite said biasing means and acting to contact the metal surface of the wheel rim to provide an extremely loud, audible sound as a result of compression and expansion of said biasing means between the belt and the rim through deflection of the tire.

Figure 2:
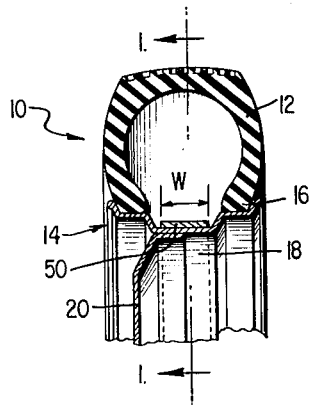
FIGURE 2 is a front elevational view of a portion of the wheel structure shown in FIGURE 1, in section, showing the method of placement of the flexible belt forming a part of the present invention on the wheel rim and within the inflatable tire.

Referring to the drawing, the audible alarm device of the present invention is adapted for use on any conventional vehicle and more commonly on passenger automobiles. It is obvious that the operator of the vehicle, even were he equipped to visually watch the wheels while the vehicle was in motion, could not occupy his time in this manner for safety reasons. In any case, the present invention is directed to an audible alarm device in which the sounds resulting from deflection of the tire caused by either deflation of the tire or overloading of the vehicle may readily be transmitted through the air or through the metal frame of the vehicle itself to the operator. For purposes of simplicity, there is shown but a single wheel as indicated at 10 which comprises the two principal elements, that is, an inflatable tubeless rubber tire 12 which is carried or supported by a conventional metal rim 14, the tire 12 being inflated by pressurized air or the like which provides a fluid seal 16 between the edges of the tire and the edges of the rim 14. The cross sectional configuration of the rim in FIGURE 2 is shown to be generally U-shaped and includes a generally flat central section 18 through which may protrude a valve stem (not shown) of a conventional nature for inflating the rubber tire 12. The rim 14 is provided with a central disk shape section 20 which includes suitable openings 22 for allowing attachment to the axle as is conventional in the art, the axle protruding through a central aperture 24.

Figure 1:
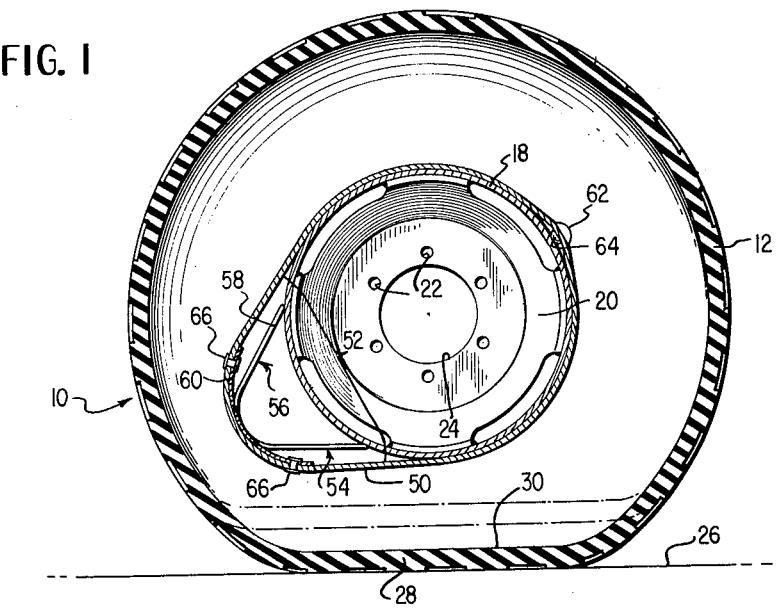
FIGURE 1 is a side elevational, sectional view of a vehicle wheel incorporating the device of the present invention.

The present invention is directed to an audible alarm device for indicating the condition of each of the rotating wheels and more particularly as a means for indicating the deflection condition of each wheel. As indicated in FIGURE 1, where the rubber tire 12 comes in contact with the surface 26 there is formed a flattened or deflected portion 28, the extent of the flattened portion and therefore the deflection of the tire at this point being determined by the inflation condition of the tire as well as the load supported by the tire. As a result of overload, the flattened portion 28 will increase and at the same time the tire will be deflected to the point where the inner surface 30 approaches the periphery of the rotating rim 18. The present invention operates on the principle that while the rim 18 is continuously rotating and the flattened portion 28 changes about the periphery of the tire, as the tire rotates and moves into contact with its supporting surface 26, any irregularity on the rotating rim 18 will eventually come into contact with the inner surface 30 of the tire opposite the flattened section 28. In this respect, the apparatus of the present invention includes a first element comprising a flexible strap or belt 50 which may be formed of any suitable material such as woven natural fibers, fiberglass, thermo-plastic or other conventional web materials but should be of a material not normally stretchable. The width W of the belt or strap 50 should be somewhat less than the width of the flattened section 18 of the steel rim and the internal diameter of the belt 50 should be somewhat in excess of the external diameter of rim 18 so as to provide a bulge as indicated at 52. Biasing means in the form of a U-shaped flat, metal spring 54 acts to frictionally position the flexible belt 50 on the periphery of rim 18 thereby retaining the belt in place and providing the aforementioned bulge 52. In the specific configuration shown, the spring member 54 comprises two sections, a relatively large U-shaped section 56 having free ends 58 which are quite resilient and are adapted to be flexed open and slide along the peripheral surface of rim 18 as a result of compression of any force acting on the outer surface of belt 50 in the area of contact with spring 54. Less resilient extensions 60 are provided extending away from the center of the spring 54 and generally adapted to contact the inner surface of the flexible belt 50 so as to form the desired bulge 52. Positioned on the side of the belt opposite that of the spring member 54 is a solid metal knocker which is shown extending through the belt and frictionally grasping each side thereof for locating the knocker 62 with respect to the belt and positioning adjacent to the peripheral surface of rim section 18. A suitable hole 64 receives the thinner portion of the knocker with the ends flattened on opposed sides of the flexible belt 50 to thereby fix the knocker 62 onto the belt for movement therewith. The spring 54 is formed from a strong piece of spring steel and as mentioned previously is approximately as wide as the wheel groove. The two free ends 58 push against the steel rim and are free to slide further apart if pressured. The flat side of the spring formed by the sections 60 may be bonded to the belt through the use of rivets 66 as shown or may be bonded by any other conventional means. Under normal operating conditions, the spring 54 is constantly tensioned and pushes itself away from the rim 18 but is resisted by the belt 50. Thus, the whole assembly is held snugly against the inside groove or flattened surface 18 of the wheel and rotates uniformly with it and the tire. The knocker 62 is in contact with the metal rim surface 18 and the position of the knocker 62, its weight and its mass are so designed as to exactly balance the mass of the spring 54 and thus the apparatus of the present invention does not disturb the normal balance of the wheel both dynamically and statically.

If the tire is properly inflated and the vehicle is properly loaded, the deflection or flattening of the portion 28 of the tire contacting the surface 26 will be so slight that there will be no physical contact between the inner surface 30 of the tire at this point and the outer surface of the bulge 52. As a result of deflation of the tire or as a result of vehicle overload, the tire will flex inwardly at its contacting point with surface 26 providing a greater flattened section 28 and the inner surface 30 of the tire will contact the bulge 52 as it rotates with the wheel each time the rotation of the wheel brings the bulge 52 into alignment with the flattened section 28. The high speed impact between the bulge 52 of the flexible belt 50 and the inner surface 30 of the rubber tire will result in high speed flexing of the spring 54 and as a result the belt will loosen about the rim 18. The knocker 62 will also be loosened and as a result of the high speed rotation of the wheel assembly it will move radially outward away from the rim. However, as soon as the continued rotation of the wheel brings the spring 54 up and away from the road the bulge 52 will be reformed with a snap action causing the belt to be rapidly tightened, bringing knocker 62 suddenly against the steel rim with considerable force. This will create a loud noise similar to a sharp hammer blow. The sound is quite loud and easily audible to the driver, either as a result of sound transmission through the air or by sound transmission through the axle and steel frame of the vehicle. In fact, the U-shaped cross section of the wheel rim acts much the same as a bell with the knocker 62 acting as the clapper. The assembly therefore forms a highly resonating structure.

Figure 3:
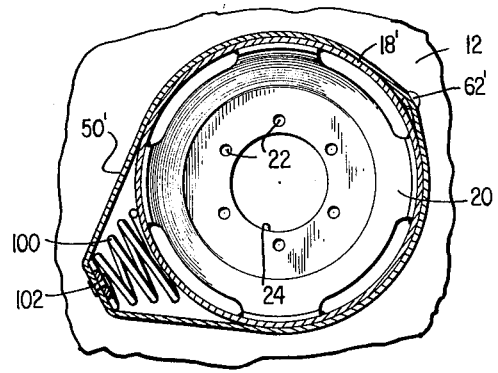
FIGURE 3 is a side elevational view, partially in section, of an alternative embodiment of this invention.

In the embodiment shown in FIGURES 1 and 2, the steel spring 54 is shown to have a main concave section and a secondary concave section of shorter length fixed centrally thereto and contacting the inner surface of belt 50. FIGURE 3 shows an alternative arrangement in which the member formed of a thin strip of spring steel has been replaced by a steel coil spring indicated at 100 which is positioned between belt 50' and the annular wheel rim 18'. The coil spring 100 may be fixed to the inner surface of the flexible belt 50 by rivet 102 and includes a contact surface on the inner end slidable upon the surface of rim section 18'. Thus, the compression of coil spring 100 would normally prevent rotation of the belt member 50' and the spring assembly about the wheel axis, however there may be slight rotation as a result of contact between the inner surface 30 of the rubber tire and the belt 50 at the bulge 52 due to excessive tire deflation.

Figure 4:
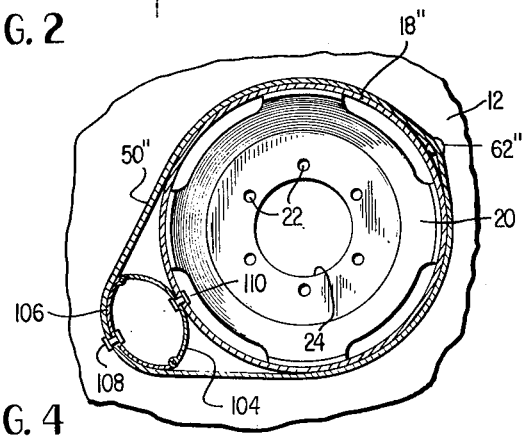
FIGURE 4 is a side elevational view, in section, of yet a third embodiment of this invention.

In like manner, FIGURE 4 shows a second alternative arrangement including springs in back to back relationship with the spring assembly formed of two U-shaped flat steel strip springs 104 and 106. The inner concave spring 104 is oppositely oriented with respect to convex spring member 106 with the ends of the springs being interengaged or locked to provide the configuration shown. The outer spring 106 may be riveted to the web 50" by rivet member 108 which passes through the center of spring member 106 while in like manner a rivet 110 may be employed for fixedly securing the center of the inner spring member 104 to the rim 18". A knocker 62 is positioned opposite the spring assembly and likewise fixed to the belt 50". Again, while it is desirable to have the spring fixed to the flexible assembly including elements 104 and 106 within the gap created by the belt 50" and rim 18" to form the desired bulge and leaving spring 104 unconnected to rim 18".

From the above description, it is obvious that the present system has multiple advantages over the known prior art arrangements. With the system in its preferred form, there is nothing at all to attach to the tire, the valve stem or to the wheel rim. The alarm system is completely unaffected by the condition of the tire carcas or the tread and the tires can be removed or changed without interference by the alarm. It is obvious that under the apparatus of the present invention, there is no complicated equipment to install, those elements which require installment may be installed by any competent mechanic in a simple and non-time consuming process. There are no batteries or other expendables which must be checked or replenished, thus eliminating servicing. As mentioned previously, the system does not require the drilling of holes or alteration to either the tire or the wheel. The system also has the advantage of being completely positionable within the inside of the tire where the environment is always dry and clean. In the advent of a blowout or leak resulting in a "flat tire" the alarm will survive a considerable amount of rough travel without damage since the spring is readily collapsible and in the preferred embodiment, the flexible belt is actually slidable allowing relative movement between the rotating rim and the encircling belt. The volume of noise produced by the simplified apparatus of the present invention is much higher than conventional audible alarms operated by the pressurized air within the tire itself due to the high level of energy available, that is, the energy which is caused purely from the weight of the vehicle.

While there have been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A vehicle tire deflection warning device for use with a vehicle including a conventional metal wheel having a rim of U-shaped cross-section acting to support an inflated rubber tire thereon, said device comprising: a flexible belt having an inner surface of a diameter in excess of the diameter of said rim and adapted to be positioned thereon, biasing means positioned between said rim and said belt to form a radially extending bulge in said flexible belt, a knocker fixed in said belt, and spaced from said bulge whereby, upon rotation of said wheel and as a result of excess tire deflection, said bulge periodically contacts the inner surface of said rubber tire resulting in said knocker moving rapidly away from said rim and returning under said bias means to contact said rim with considerable force and to thereby produce audible sounds indicative of said excess deflection.

2. The apparatus as claimed in claim 1 wherein said biasing means comprises a compression spring fixed at one end to said inner surface of said belt and extending radially toward said wheel rim and in contact therewith.

3. The apparatus as claimed in claim 1 wherein said knocker is positioned 180° from said biasing means to dynamically and statically balance said warning device on said rotating wheel.

4. The apparatus as claimed in claim 1 wherein said biasing means comprise a spring assembly formed of a pair of spring steel strip members having concave configuration and positioned in back to back relationship between said flexible belt and said wheel rim.

5. The apparatus as claimed in claim 1 wherein said biasing means comprises a spring assembly including at least one spring element of concave configuration with terminal free ends, said spring element being fixed at its center to said belt and having the free ends thereof contacting the surface of said wheel rim and movable thereabout.

No references cited.